United States Patent [19]

Viltro et al.

[11] Patent Number: 5,517,737
[45] Date of Patent: May 21, 1996

[54] APPARATUS FOR CONTINUOUSLY STRETCHING OR CONTINUOUSLY RELEASING STRETCHING FORCES FROM A WEB USING TWO PAIRS OF OPPOSING NON-PLANAR BELTS

[75] Inventors: L. John Viltro, Hamilton; David M. Weirich, Cincinnati, both of Ohio

[73] Assignee: The Procter & Gamble Company, Cincinnati, Ohio

[21] Appl. No.: 254,812

[22] Filed: Jun. 6, 1994

[51] Int. Cl.$^6$ ................................................. D06C 3/00
[52] U.S. Cl. .................................................. 26/88; 26/97
[58] Field of Search .................................. 26/87, 88, 89, 26/90, 97, 98, 99, 51; 271/272, 188; 226/172; 198/458

[56] References Cited

U.S. PATENT DOCUMENTS

| | | | |
|---|---|---|---|
| 2,039,312 | 5/1936 | Goldman | 161/59 |
| 2,328,827 | 9/1943 | Martin | 26/89 |
| 2,397,838 | 4/1946 | Chavannes | 154/1 |
| 2,429,177 | 10/1947 | Young | 154/124 |
| 2,434,111 | 1/1948 | Hawley, Jr. et al. | 117/7 |
| 2,594,229 | 4/1952 | Snyder et al. | 154/124 |
| 2,597,877 | 5/1952 | Le Clair . | |
| 2,618,012 | 11/1952 | Milne | 26/88 |
| 2,841,820 | 7/1958 | Pfeiffer | 26/88 |
| 2,866,231 | 12/1958 | Vaughan | 26/88 |
| 3,094,330 | 6/1963 | Smith | 273/54 |
| 3,176,364 | 4/1965 | Dritz | 24/213 |
| 3,214,323 | 10/1965 | Russell et al. | 161/148 |
| 3,235,644 | 2/1966 | Rasmussen | 26/88 |
| 3,266,841 | 8/1966 | Altman | 297/220 |
| 3,277,547 | 10/1966 | Billarant | 24/204 |
| 3,319,307 | 5/1967 | Marforio | 24/204 |
| 3,327,708 | 6/1987 | Sokolowski | 128/156 |
| 3,405,430 | 10/1968 | Sidelman | 24/204 |
| 3,431,665 | 3/1969 | Weir | 26/87 |
| 3,436,935 | 4/1969 | Quoos et al. | 26/98 |
| 3,469,289 | 9/1969 | Whitacre | 24/205.17 |
| 3,490,107 | 1/1970 | Brumlik | 24/204 |
| 3,494,006 | 2/1970 | Brumlik | 24/204 |
| 3,665,921 | 5/1972 | Stumpf | 128/287 |
| 3,665,922 | 5/1972 | Skore | 128/290 |
| 3,694,867 | 10/1972 | Stumpf | 24/204 |

(List continued on next page.)

FOREIGN PATENT DOCUMENTS

| | | |
|---|---|---|
| 0258015 | 3/1988 | European Pat. Off. . |
| 0341993 | 11/1989 | European Pat. Off. . |
| 0604731A1 | 7/1994 | European Pat. Off. . |
| 1222034 | 6/1990 | France . |
| 1140576 | 1/1969 | United Kingdom . |
| 1299897 | 12/1972 | United Kingdom . |
| WO92/01401 | 2/1992 | WIPO . |
| WO94/08789 | 4/1994 | WIPO . |

OTHER PUBLICATIONS

U.S. patent application Ser. No. 08/254,814 filed Jun. 6, 1994 entitled "Elastomeric Disposable Absorbent Article and Method of Making Same" in the name of Allen et al.

*Primary Examiner*—Amy B. Vanatta
*Attorney, Agent, or Firm*—Michael J. D'Amelio; Dean L. Garner; Michael E. Hilton

[57] ABSTRACT

In accordance with the present invention there is provided an apparatus for conveying a web. The apparatus is able to continuously stretch the web or continuously release the stretching forces from a web in the cross-machine direction. The apparatus includes two pairs of opposing belts wherein each belt travels along an endless path. The pairs of belts diverge or converge from each other in the cross-machine direction. Each pair of belts comprises an upper belt and a lower belt which are adjacent to each other. Each of the upper and lower belts has a non-planar outer surface which contacts the web. The non-planar outer surfaces of each upper belt continuously abuts the non-planar outer surface of its adjacent lower belt along a predetermined distance when traveling in the machine direction. This creates at least one nip for continuously gripping the web while it is being conveyed. The apparatus also includes a means for driving the belts so as to convey the web in the machine direction.

11 Claims, 6 Drawing Sheets

U.S. PATENT DOCUMENTS

| | | | |
|---|---|---|---|
| 3,708,831 | 1/1973 | Burger | 26/88 |
| 3,708,833 | 1/1973 | Ribich et al. | 24/204 |
| 3,867,744 | 2/1975 | Tsuchida | 26/97 |
| 3,895,797 | 7/1975 | Moore | 273/32 A |
| 3,916,491 | 11/1975 | Kampf | 26/57 R |
| 3,949,128 | 4/1976 | Ostermeier | 428/152 |
| 4,105,484 | 8/1978 | Newton et al. | 156/380 |
| 4,116,892 | 9/1978 | Schwarz | 521/62 |
| 4,223,059 | 9/1980 | Schwarz | 428/198 |
| 4,355,066 | 10/1982 | Newman | 428/198 |
| 4,364,787 | 12/1982 | Radzins | 156/164 |
| 4,374,888 | 2/1983 | Bornslaeger | 428/198 |
| 4,379,192 | 4/1983 | Wahiquist et al. | 428/156 |
| 4,600,618 | 7/1986 | Raychok, Jr. et al. | 428/92 |
| 4,725,473 | 2/1988 | Van Gompel et al. | 428/156 |
| 4,761,318 | 8/1988 | Ott et al. | 428/85 |
| 4,761,322 | 8/1988 | Raley | 428/198 |
| 4,862.564 | 9/1989 | Kwack | 26/89 |
| 4,925,520 | 5/1990 | Beaudoin et al. | 156/494 |
| 4,943,340 | 7/1990 | Ujimoto et al. | 156/496 |
| 4,973,326 | 11/1990 | Wood et al. | 604/391 |
| 5,032,122 | 7/1991 | Noel et al. | 604/391 |
| 5,043,036 | 8/1991 | Swenson | 156/160 |
| 5,308,345 | 5/1994 | Herrin | 604/385.2 |
| 5,326,612 | 7/1994 | Goulait | 428/100 |

APPARATUS FOR CONTINUOUSLY STRETCHING OR CONTINUOUSLY RELEASING STRETCHING FORCES FROM A WEB USING TWO PAIRS OF OPPOSING NON-PLANAR BELTS

FIELD OF THE INVENTION

The present invention relates to an apparatus for conveying a web of material in the machine direction while continuously stretching or releasing stretching forces from the web in the cross-machine direction.

BACKGROUND OF THE INVENTION

During the manufacture of many consumer products, such as absorbent articles like diapers, catamenials and the like, there is a need during the manufacturing process to stretch elastic webs of material in the cross-machine direction while the web is being conveyed in the machine direction. Often times there is also a need to stretch these materials during one step of the manufacturing process and then allow these materials to return to their natural un-tensioned state by releasing the stretching forces. Such is the case when creating loop fastening means for refastenable fastening devices as described in commonly assigned and concurrently filed U.S. patent application Ser. No. 08/254,814, P&G case 5294, titled "NONWOVEN FEMALE COMPONENT FOR REFASTENABLE FASTENING DEVICE AND METHOD OF MAKING THE SAME" filed on Jun. 6, 1994 in the names of Allen et al., the disclosure of which is hereby incorporated herein by reference.

In the past, webs of material were stretched while they were being conveyed through the use of tentering equipment. Tentering equipment usually consists of a series of spring loaded clamps attached to a pair of opposing carrier chains. These chains are adjustable in width to provide a desired amount of stretch so as to increase the width of the material. However, these clamps are discrete and discontinuous and produce high stresses in the web material adjacent to the clamping area. This would often cause the web material to rip or tear during the manufacturing process.

In addition, there has been conveying machines for conveying webs of material which would grip the outer edges of the web. An example of such an apparatus that uses what is referred to in the art as a V-Belt is shown in U.S. Pat. No. 4,943,340 issued to Ujimoto et al. on Jul. 4, 1990 and is hereby incorporated herein by reference. V-belts, such as the one disclosed in the herein incorporated reference, use two pairs of belts having V-shaped cross-sections wherein the flat part of the belts make contact with the web of material in order to convey it. However, this type of apparatus will not adequately stretch webs in the cross-machine direction because the belts do not provide sufficient gripping force to hold onto the web. Consequently, the web of material would have a tendency to slip off of the belts resulting in costly shut down time.

There has therefore been a desire to provide an apparatus which can convey a web and continuously stretch the web in the cross-machine direction while it is being conveyed, without the use of clamps, adhesives or the like. There has also been a desire to use such an apparatus to continuously decrease the width of a stretched web so as to remove the stretching forces therefrom.

SUMMARY OF THE INVENTION

In accordance with the present invention there is provided an apparatus for conveying a web. The apparatus is able to continuously stretch the web in the cross-machine direction. The apparatus includes two pairs of opposing belts wherein each belt travels along an endless path. The pairs of belts diverge from each other in the cross-machine direction. Each pair of belts comprises an upper belt and a lower belt which are adjacent to each other. Each of the upper and lower belts has a non-planar outer surface for contacting the web. The non-planar outer surfaces of each upper belt continuously abuts the non-planar outer surface of its adjacent lower belt along a predetermined distance when traveling in the machine direction. This creates at least one nip for continuously gripping the web while it is being conveyed. The apparatus also includes a means for driving the belts so as to convey the web in the machine direction.

In accordance with another aspect of the present invention there is provided an apparatus for conveying a web wherein the apparatus is able to continuously release stretching forces from a web. The apparatus has two pairs of opposing belts wherein each belt travels along an endless path. The pairs of belts converge towards each other in the cross machine direction. Each pair of belts comprises an upper belt and a lower belt which are adjacent to each other. Each of the upper and lower belts has a non-planar outer surface for contacting the web. The non-planar outer surfaces of each upper belt continuously abuts the non-planar outer surface of its adjacent lower belt along the predetermined distance when traveling in the machine direction. This creates at least one nip for continuously gripping the web. The apparatus also has a driver for driving the belts so as to convey the web in the machine direction.

BRIEF DESCRIPTION OF THE DRAWINGS

While the specification concludes with claims particularly pointing out and distinctly claiming the subject invention, it is believed the same will be better understood from the following description taken in conjunction with the accompanying drawings in which:

DETAILED DESCRIPTION OF THE INVENTION

Figure 1:
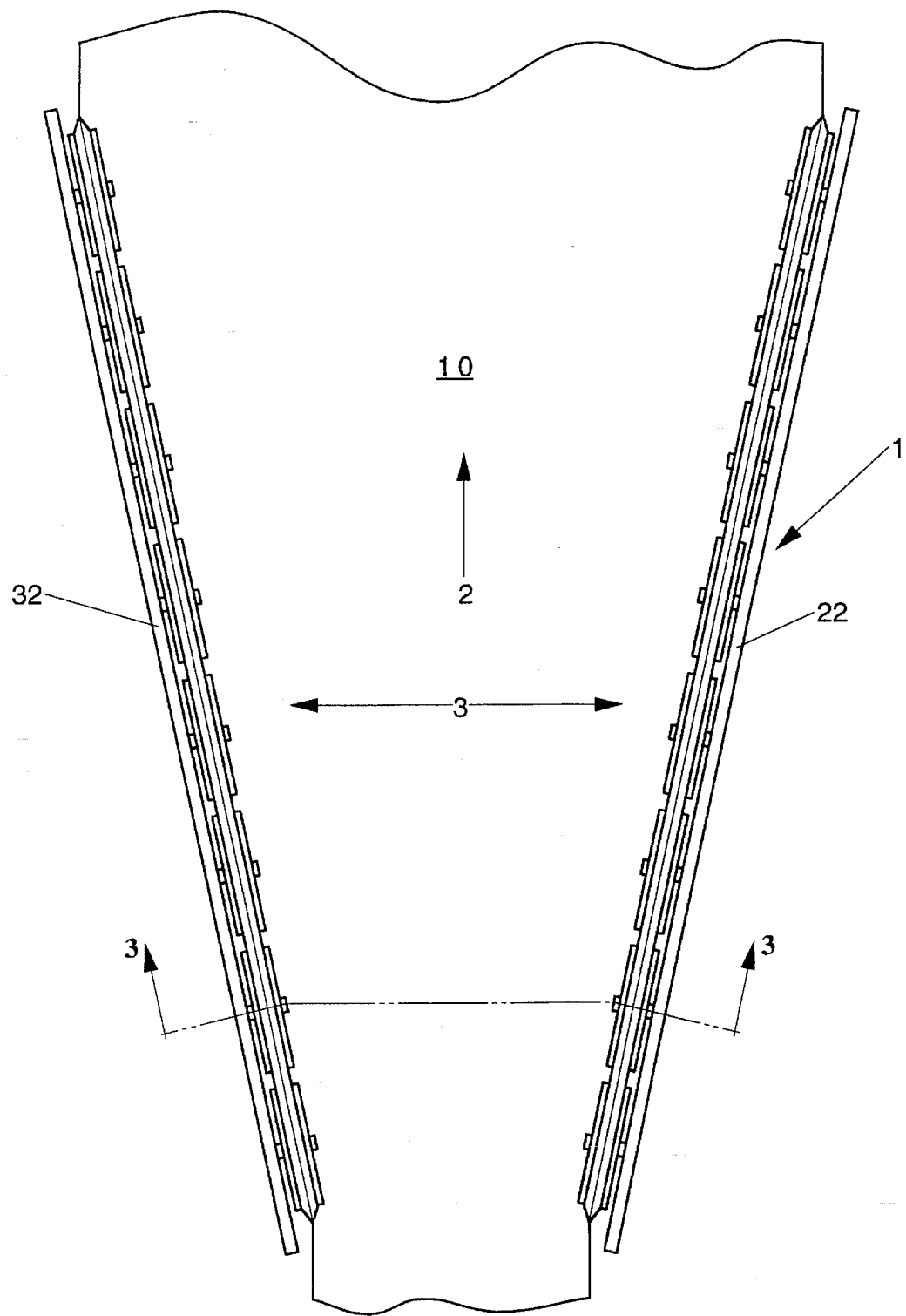
FIG. 1 is a plan view of an apparatus in accordance with the present invention.

Referring now to the drawings in detail wherein like numerals indicate the same element throughout the views there is shown in FIG. 1 a plan view of an apparatus 1 for continuously stretching a web 10 in accordance with the present invention. Apparatus 1 conveys web 10 in the machine direction, indicated by arrow 2, and stretches the web in the cross-machine direction, indicated by arrow 3. As seen from FIG. 3 apparatus 1 comprises two pairs of opposing belts 21, 22 and 31, 32. As seen from FIG. 3 each belt travels along an endless path, and as seen from FIG. 1 again, the pairs of belts 21, 22 and 31, 32 diverge from each other in the cross-machine direction 3, at any desired angle such as 30°, depending on various factors such as the material to be stretched and the amount of stretch desired.

Figure 3:
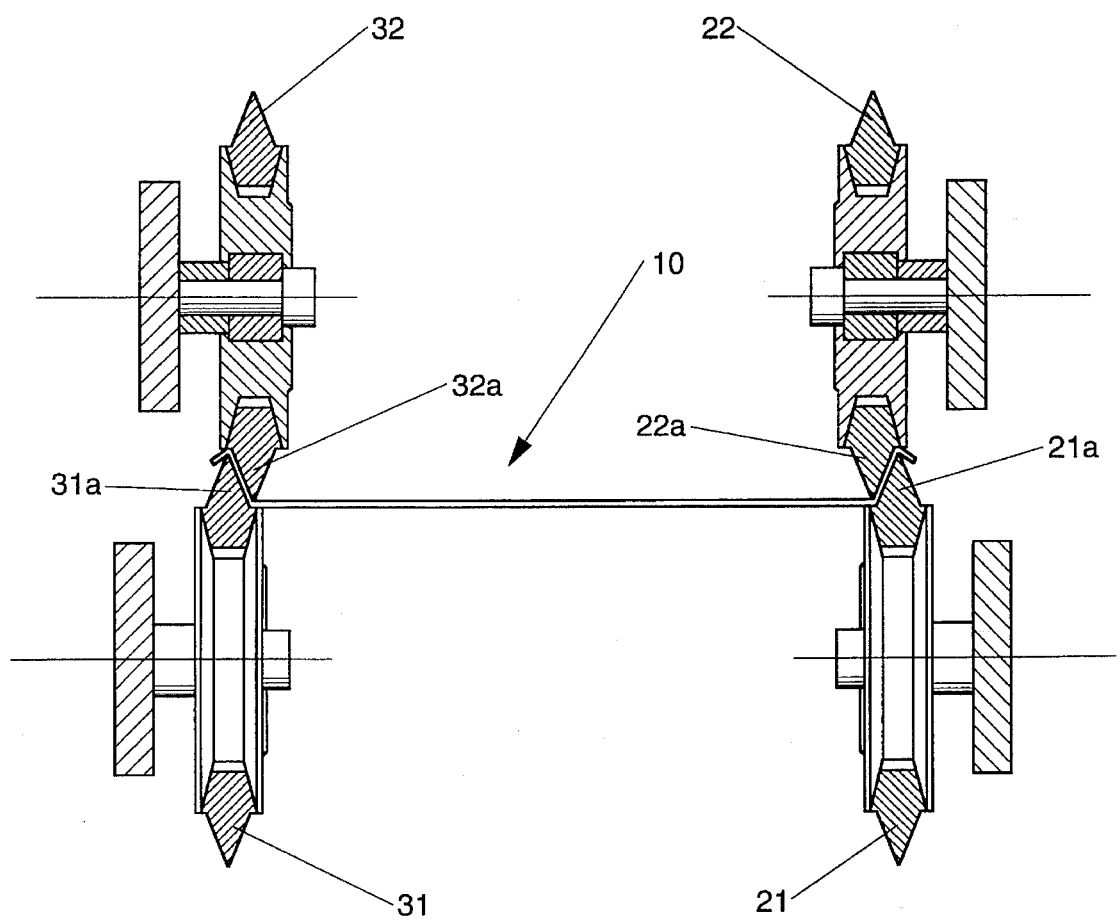
FIG. 3 is a cross-section of the apparatus of FIG. 1 taken along lines 3—3.

The apparatus 1 can better be explained by referring to FIG. 3 which is a cross-section of FIG. 1 taken along line 3—3. The apparatus comprises two upper belts 22 and 32 and two lower belts 21 and 31. Upper belt 22 is adjacent lower belt 21 and upper belt 32 is adjacent lower belt 31. Each of the upper and lower belts has a non-planar outer surface 21a, 22a, 31a and 32a for contact with web 10. The non-planar outer surface of each upper belt, 22a and 32a, substantially continuously abuts the non-planar outer surface of its adjacent lower belt, 21a and 31a respectively, along a predetermined distance in the machine direction. As will be discussed below, the abutting relationship between the non-planar outer surfaces of belts 21 and 22 and those of 31 and 32 create nips for gripping web 10 along its outer edges. The non-planar outer surfaces of belts 21, 22, 31 and 32 are shown in the figures as having an outwardly disposed triangular shape, however, any number of non-planar surfaces can be used to create the nip.

Figure 4:
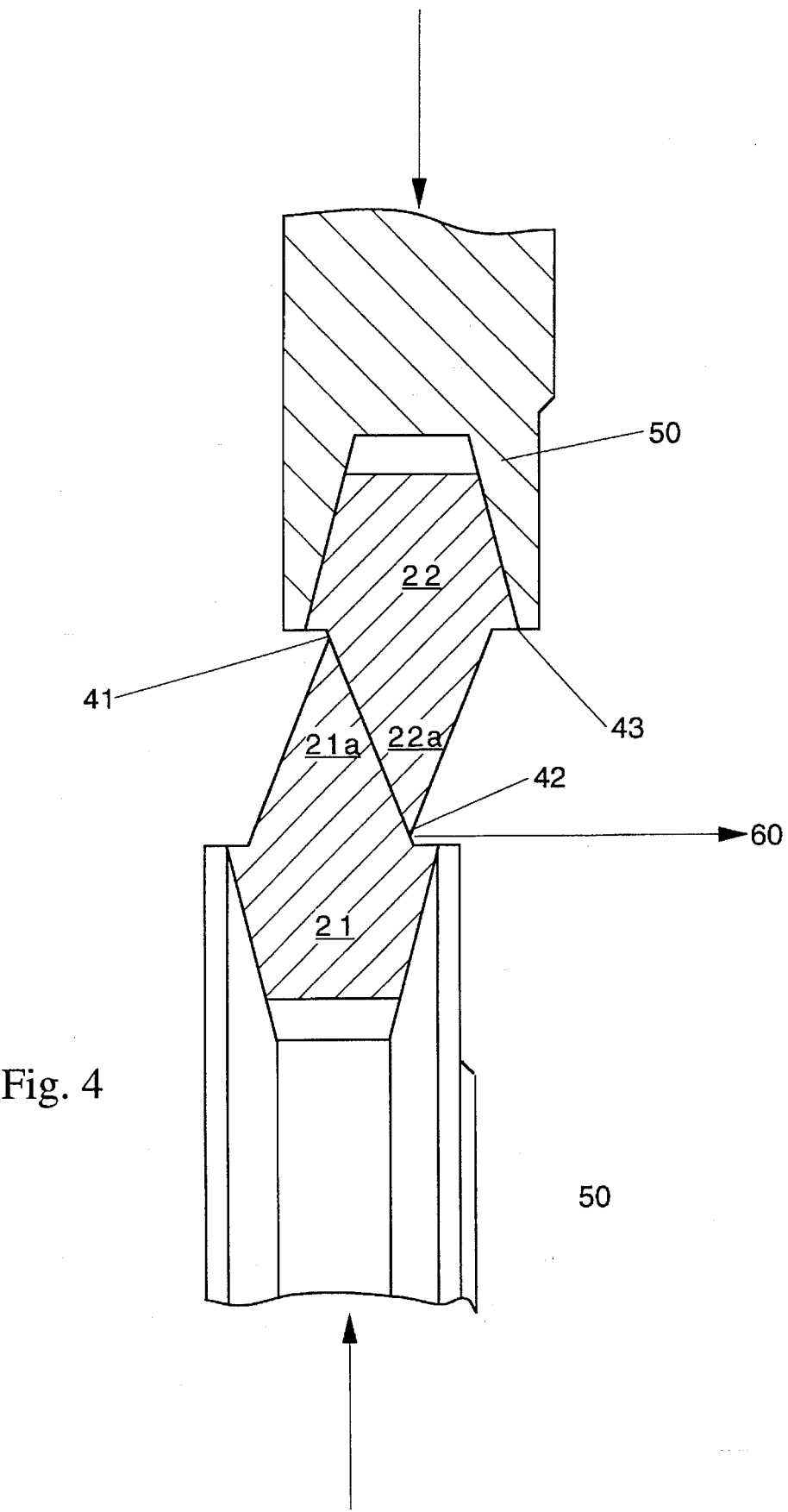
FIG. 4 is a view similar to FIG. 3 but showing belts 21 and 22 up close.

The embodiment shown in the Figures can best be described by referring to FIG. 4. As seen from that figure, when the web 10 is initially placed on the apparatus, two nip points 41 and 42 are created. The interference fit between these points is preferably from about 0.005 in. to about 0.015 in. A lateral force in the direction of arrow 60 is applied to belts 21 and 22 due to the web being stretched in the cross-machine direction. As this force is applied, the tip of non-planar outer surface 22a moves allowing nip 42 to open somewhat. However, as the force is applied to the area adjacent nip 42 a counter clockwise rotation of belt 22 around point 43 occurs causing nip 41 to tighten and increase the interference fit. Moreover, because the distance from nip 42 to point 43 is roughly equal to the distance from nip 42 to nip 41 the increased nip pressure at 41 is proportional to the lateral force applied to the belts.

In a preferred embodiment belts 21, 22, 31 and 32 are made from urethane, such as an A section "High Ridge Top" V-Belt manufactured by Eagle Urethane Belting, Des Plaines, Ill. 60018. However, the belts can be made from any suitable material known in the art including other thermosetting plastics.

Figure 2:
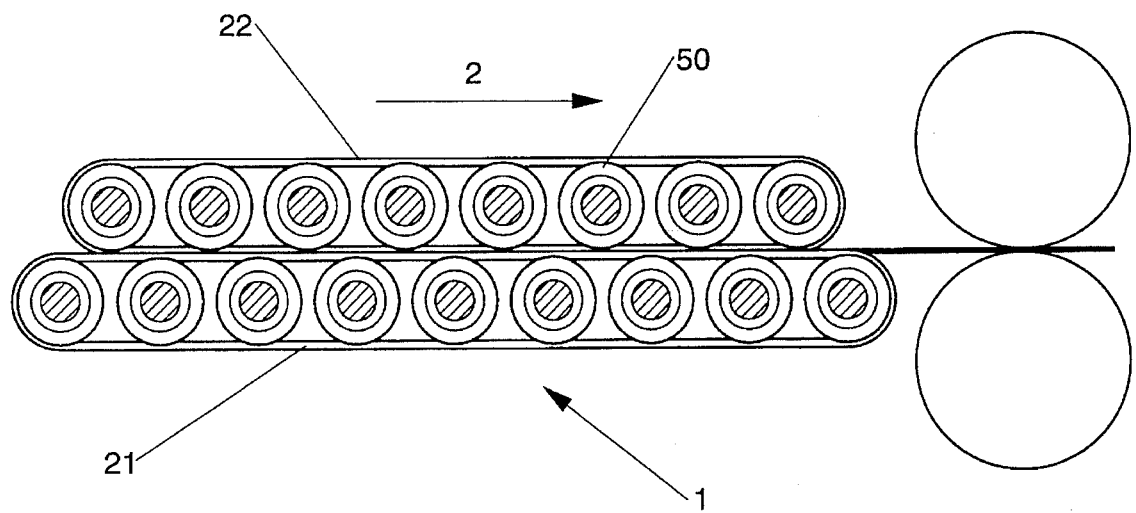
FIG. 2 is a side view of the apparatus in accordance with the present invention.

It is preferred that upper belts and lower belts exert a certain amount of pressure on the web along the predetermined distance that it is to be stretched. Preferably, this pressure can range from about 1 to about 4 pounds per inch of belt. As seen from FIG. 2, in order to accomplish this, apparatus 1 has a series of substantially parallel rollers 50 which belts 21, 22, 31 and 32 travel around along their endless path. Rollers that are suitable for this purpose include 3 in. diameter glass reinforced nylon idlers for "A" section V-belts model #6234K43 available from the Efson Co., Wilmington, N.C. 28405. Other suitable rollers known to those skilled in the art can also be used.

Figure 5:
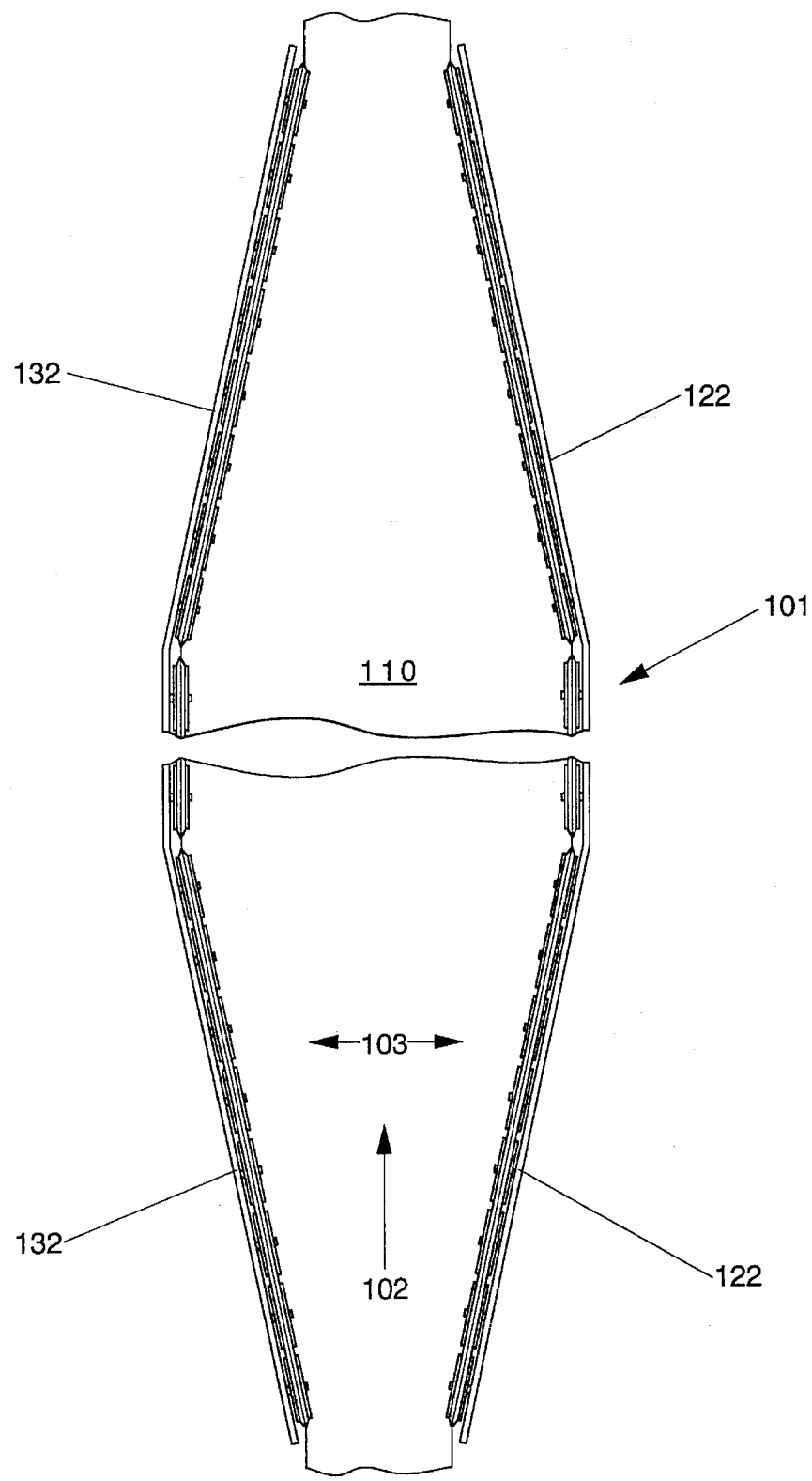
FIG. 5 is a plan view of an alternative embodiment of an apparatus in accordance with the present invention.

The apparatus 1 can also be used for continuously releasing stretching forces from an elastic web which has been stretched in the cross-machine direction. As will be appreciated by those skilled in the art the only significant difference in the layout of the apparatus will be that the pairs of belts 21, 22 and 31, 32 will converge towards each other in the cross-machine direction instead of diverge from each other. Moreover, the same apparatus can be used to initially stretch the web, and thereafter continuously release the stretching forces from the web. A plan view of such an apparatus is shown in FIG. 5. FIG. 5 shows an apparatus 101 for conveying web 110 in the machine direction, indicated by arrow 102. Apparatus 101 is similar to apparatus 1 and comprises two pairs of opposing belts 121 (not shown), 122 and 131 (not shown), 132. Belt pairs 121, 122 and 131,132 initially diverge in the cross-machine direction, indicated by arrow 103. Thereafter, the belts can then travel along parallel paths to convey the web further in the machine direction. Lastly, belt pairs 121, 122 and 131, 132 begin to converge towards each other so as to release the stretching forces from the web.

Figure 6:
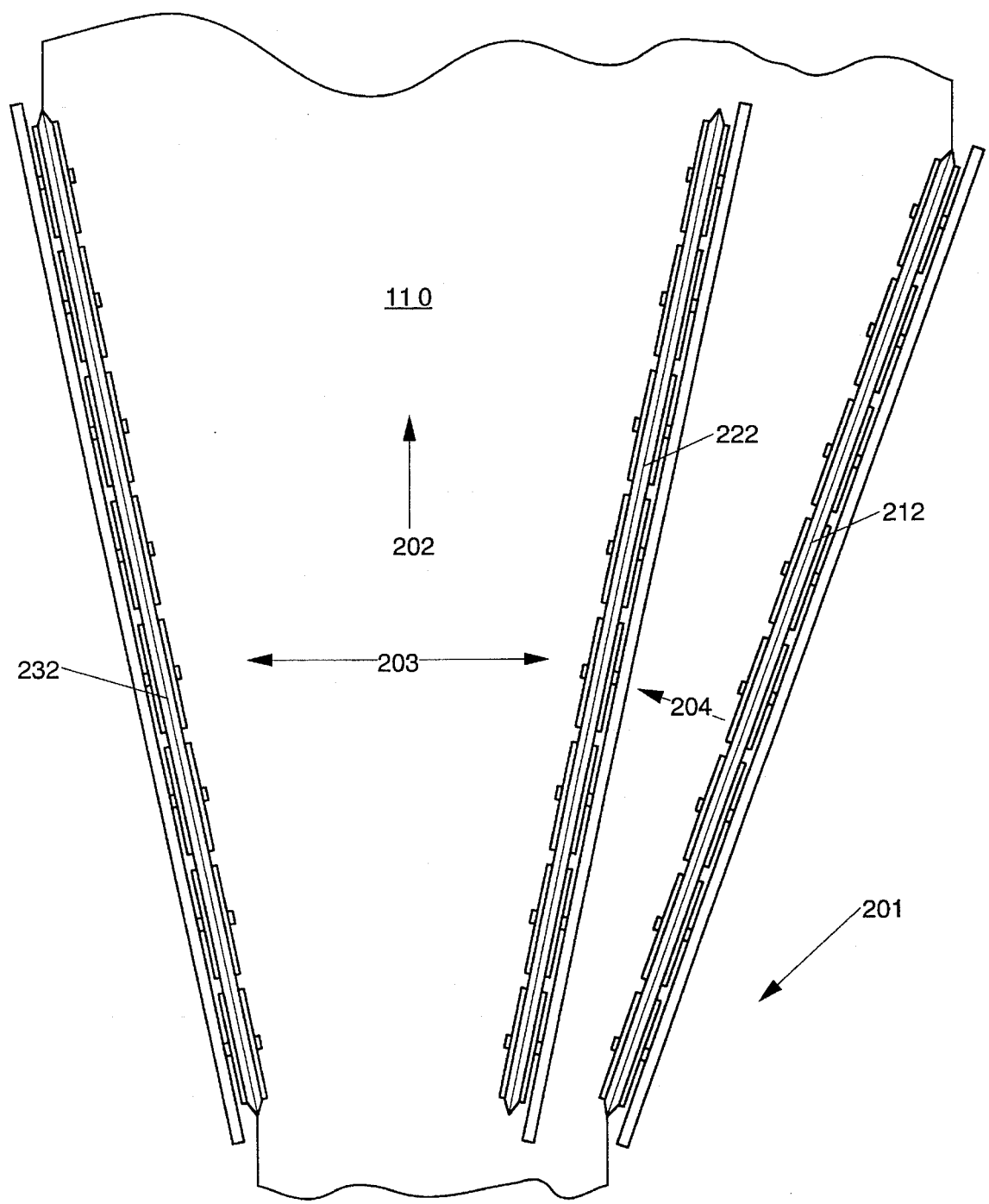
FIG. 6 is a plan view of yet another alternative embodiment of an apparatus in accordance with the present invention.

Another alternative embodiment is shown in FIG. 6. In that Figure there is shown apparatus 201 having 3 pairs of opposing belts wherein only the upper belts 212, 222 and 232 are shown. Apparatus 201 stretches web 210 at different rates as the web travels in the machine direction. Web 210 is stretched at a higher angle between belts 232 and 222, as indicated by arrow 203, than between belts 212 and 222 as indicated by arrow 204. Any number pf pairs of belts can be used to differentially stretch a web in this manner.

Lastly, the apparatus includes a driver or a means for driving the belts in the machine direction so they can convey the web in the machine direction. In a preferred embodiment the driver is an "a" belt sheave model #AK64 manufactured by Browning Manufacturing, Maysville, Ky. 41056.

While particular embodiments of the present invention have been illustrated and described herein it will be obvious to those skilled in the art that various changes and modifications can be made without departing from the spirit and scope of the present invention and it is intended to cover in the appended claims all such modifications that are within the scope of this invention.

What is claimed is:

1. An apparatus for conveying a web, said apparatus being able to continuously stretch said web in the cross-machine direction, said apparatus comprising:

(a) two pairs of opposing belts wherein each belt travels along an endless path, said pairs of belts diverge from each other in the cross-machine direction, each pair of belts comprising an upper belt and a lower belt which are adjacent to each other, each of said upper and lower belts has an outwardly disposed substantially triangular shaped cross-sectional outer surface for contact with opposing edges of said web, said outer surfaces of said upper belts substantially continuously abut the outer surfaces of adjacent lower belts along a pre-determined distance when traveling in the machine direction, along said opposing edges, so as to create at least one nip for substantially continuously gripping said web edges, the belts' outwardly disposed triangular shaped surfaces converge to an apex and the apex of the upper belts creates one nip and the apex of the lower belts creates another nip when the upper and lower belts are in operative contact; and (b) a means for driving said belts so as to convey said web in the machine direction.

2. The apparatus according to claim 1 wherein each belt is an A-section V-belt.

3. The apparatus according to claim 2 wherein said belts are made from urethane.

4. The apparatus of claim 1 wherein each pair of adjacent upper and lower belts has an interference fit between about 0.005 in. to about 0.015 in.

5. The apparatus according to claim 1 wherein said upper and lower belts travel along their endless paths while being conveyed upon a plurality of rollers.

6. The apparatus according to claim 1 further including a third pair of belts so that different regions of said web along the cross-machine direction can be stretched at different angles.

7. An apparatus for conveying a web, said apparatus being able to continuously stretch said web in the cross-machine direction, said apparatus comprising:

(a) two pairs of opposing belts wherein each belt travels along an endless path, said pairs of belts diverge from each other in the cross-machine direction, each pair of belts comprising an upper belt and a lower belt which are adjacent to each other, each of said upper and lower belts has an outwardly disposed substantially triangular shaped cross-sectional outer surface for contact with opposing edges of said web, said outer surfaces of said upper belts substantially continuously abut the outer surfaces of adjacent lower belts along a pre-determined distance when traveling in the machine direction, along said opposing edges, so as to create at least one nip for substantially continuously gripping said web edges, the belts' outwardly disposed triangular shaped surfaces converge to an apex and the apex of the upper belts creates one nip and the apex of the lower belts creates another nip when the upper and lower belts are in operative contact; and (b) a driver for driving said belts so as to convey said web in the machine direction.

8. An apparatus for conveying an elastic web, said web being under tension in the cross-machine direction, said apparatus being able to continuously release said tension on said web, said apparatus comprising:

(a) two pairs of opposing belts wherein each belt travels along an endless path, said pairs of belts converging towards each other in the cross-machine direction, each pair of belts comprising an upper belt and a lower belt which are adjacent to each other, each of said upper and lower belts has an outwardly disposed substantially triangular shaped cross-sectional outer surface for contact with opposing edges of said web, said outer surfaces of said upper belts substantially continuously abut the outer surfaces of adjacent lower belts along a pre-determined distance when traveling in the machine direction, along said opposing edges, so as to create at least one nip for substantially continuously gripping said web edges, the belts' outwardly disposed triangular shaped surfaces converge to an apex and the apex of the upper belts creates one nip and the apex of the lower belts creates another nip when the upper and lower belts are in operative contact; and (b) a means for driving said belts so as to convey said web in the machine direction.

9. An apparatus for conveying an elastic web, said web being under tension in the cross-machine direction, said apparatus being able to continuously release said tension on said web, said apparatus comprising:

(a) two pairs of opposing belts wherein each belt travels along an endless path, said pairs of belts converging towards each other in the cross-machine direction, each pair of belts comprising an upper belt and a lower belt which are adjacent to each other, each of said upper and lower belts has an outwardly disposed substantially triangular shaped cross-sectional outer surface for contact with opposing edges of said web, said outer surfaces of said upper belts substantially continuously abut the outer surfaces of adjacent lower belts along a pre-determined distance when traveling in the machine direction, along said opposing edges, so as to create at least one nip for substantially continuously gripping said web edges, the belts' outwardly disposed triangular shaped surfaces converge to an apex and the apex of the upper belts creates one nip and the apex of the lower belts creates another nip when the upper and lower belts are in operative contact; and (b) a driver for driving said belts so as to convey said web in the machine direction.

10. An apparatus for conveying an elastic web, said apparatus being able to continuously stretch said web in the cross-machine direction and thereafter continuously release said tension on said web, said apparatus comprising:

(a) two pairs of opposing belts wherein each belt travels along an endless path, said pairs of belts initially diverge towards each other in the cross-machine direction and thereafter converge towards each other, each pair of belts comprising an upper belt and a lower belt which are adjacent to each other, each of said upper and lower belts has an outwardly disposed substantially triangular shaped cross-sectional outer surface for contact with opposing edges of said web, said outer surfaces of said upper belts substantially continuously abut the outer surfaces of adjacent lower belts along a pre-determined distance when traveling in the machine direction, along said opposing edges, so as to create at least one nip for substantially continuously gripping said web edges, the belts' outwardly disposed triangular shaped surfaces converge to an apex and the apex of the upper belts creates one nip and the apex of the lower belts creates another nip when the upper and lower belts are in operative contact; and a driver for driving said belts so as to convey said web in the machine direction.

11. The apparatus according to claim 10 wherein each belt is an A-section V-belt.

* * * * *